United States Patent [19]
Ishida et al.

[11] Patent Number: 6,088,178
[45] Date of Patent: *Jul. 11, 2000

[54] MAGNETIC RECORDING AND REPRODUCING APPARATUS

[75] Inventors: Tatsuaki Ishida, Sakai; Ryuji Sugita, Hirakata; Hiroyuki Hasegawa, Tsuzuki-gun, all of Japan

[73] Assignee: Matsushita Electric Industrial Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/760,452

[22] Filed: Dec. 6, 1996

[30] Foreign Application Priority Data

Dec. 8, 1995 [JP] Japan ................................. 7-319837

[51] Int. Cl.$^7$ ........................................................ G11B 5/09
[52] U.S. Cl. .............................................. 360/50; 360/46
[58] Field of Search ............................. 360/46, 50, 119, 360/121, 126, 135, 113, 120, 122

[56] References Cited

U.S. PATENT DOCUMENTS

| | | | |
|---|---|---|---|
| 3,956,769 | 5/1976 | Beecroft et al. | 360/121 X |
| 4,313,140 | 1/1982 | Keidl | 360/77.01 |
| 4,908,724 | 3/1990 | Jeffers | 360/121 X |
| 4,933,795 | 6/1990 | Nigam | 360/121 |
| 4,941,064 | 7/1990 | Tottori et al. | 360/121 X |
| 5,021,895 | 6/1991 | Heitmann | 360/121 X |
| 5,128,811 | 7/1992 | Van Gestel | 360/119 X |
| 5,132,859 | 7/1992 | Andricacos et al. | 360/126 X |
| 5,155,645 | 10/1992 | Shimizu et al. | 360/126 |
| 5,181,149 | 1/1993 | Katsumata et al. | 360/119 |
| 5,198,949 | 3/1993 | Narisawa et al. | 360/119 X |
| 5,285,331 | 2/1994 | White | 360/77.12 |
| 5,309,306 | 5/1994 | Okada et al. | 360/121 |
| 5,492,774 | 2/1996 | Tateno et al. | 360/119 X |

FOREIGN PATENT DOCUMENTS

| | | |
|---|---|---|
| 0 317 013 A1 | 5/1989 | European Pat. Off. . |
| 63-16808 | 4/1988 | Japan . |
| 5-234058 | 9/1993 | Japan . |

OTHER PUBLICATIONS

Patent Abstracts of Japan; vol. 015, No. 023 (P–1155); Jan. 18, 1991 & JP 02 265001 A (Matsushita Electric Ind Co Ltd); Oct. 29, 1990; *abstract*.

Patent Abstracts of Japan; vol. 015, No. 103 (P–1178); Mar. 12, 1991 & JP 02 310818 A (Toshiba Corp); Dec. 26, 1990; *abstract*.

Patent Abstracts of Japan; vol. 012, No. 300 (P–745); Aug. 16, 1988 & JP 63 071910 A (Fuji Xerox Co Ltd); Apr. 1, 1988; *abstract*.

Patent Abstracts of Japan; vol. 017, No. 029 (P–1472); Jan. 20, 1993 & JP 04 251405 A (Pioneer Electron Corp); Sep. 7, 1992; *abstract*.

*Primary Examiner*—Paul Loomis
*Assistant Examiner*—K. Wong
*Attorney, Agent, or Firm*—Parkhurst & Wendel, L.L.P.

[57] ABSTRACT

An apparatus for recording and reproducing a signal using a thin film magnetic tape as a medium and using ring type magnetic heads for recording and reproducing the signal, wherein the gap length of the magnetic head for reproducing is larger than the gap length of the magnetic head for recording. Maximum recording and reproducing performance is achieved by implementing separate recording and reproducing heads.

7 Claims, 8 Drawing Sheets

8 MAGNETIC TRANSITION REGION

9 INTER-MAGNETIC TRANSITION REGION

MAGNETIC RECORDING AND REPRODUCING APPARATUS

BACKGROUND OF THE INVENTION

1. Field of the Invention

The invention relates to a magnetic recording and reproducing apparatus of a large capacity which is excellent in high-density recording and reproducing characteristics.

2. Related Background Art

In a magnetic recording and reproducing apparatus, in order to realize a miniaturization and a large capacity, there is a tendency at present to realize a high-density recording. In a field of a magnetic tape memory apparatus as well, in order to improve recording and reproducing characteristics in a high recording density region, various researches related to a magnetic tape and a magnetic head have been performed.

In a magnetic recording medium, in order to improve recording and reproducing resolutions in the high recording density region, it is necessary to increase a residual magnetization, realize a high coercive force to match the magnitude of the residual magnetization, and thin a magnetic layer. Particularly, from this viewpoint, as a medium that is superior to a conventional coated magnetic recording medium, a thin film magnetic recording medium made by a vacuum evaporating method, a sputtering method, an ion plating method, or the like attracts attention.

As a representative example of the thin film type magnetic recording medium, there is a metal evaporated tape which has been put into practical use for a VCR of the Hi8 system and a digital VCR of the DV format system. Different from a conventional longitudinal recording medium, the magnetic tape is characterized by having an oblique magnetic anisotropy such that an easy axis is inclined from a film normal direction of a magnetic layer. That is, the easy axis is not located in a film plane or in the film normal direction but the axis is located in the direction which is inclined from the film normal direction in a normal plane including the longitudinal direction of the tape. For example, in a commercially available metal evaporated tape for the Hi8 system VCR, the easy axis is inclined from the film normal direction by about 70° in the normal plane including the longitudinal direction of the tape. A magnetization recorded by a ring type magnetic head is remained in the inclined easy axis direction, thereby forming a magnetization mode different from a conventional longitudinal recording. Due to the formation of such an inclined magnetization mode, the high recording density characteristics are remarkably improved as compared with that of the longitudinal record medium.

As it becomes clear that the above thin film tape is superior to the coated tape, which forms a longitudinal magnetization mode, it is being examined to introduce the thin film tape in a field of a VCR for broadcasting use and a magnetic tape storage device for computer in which hitherto, the coated tape such as an MP (metal particle) tape or the like has been a main stream as well.

In the VCR for broadcasting use and magnetic tape storage device for computer, what is called a separately recording and reproducing method in which a recording head and a reproducing head are individually provided is generally used.

Consequently, a signal just after completion of the recording is reproduced, thereby enabling a recording error to be reduced (called a read-after-write method). Moreover, a magnetic head parameter (or dimension) in a recording step and a magnetic head parameter (or dimension) in a reproducing step can be independently designed. That is, from a point to improve the recording and reproducing characteristics, the head parameters or dimensions having what is called a trade-off relation in a self recording and reproducing system are individually optimized in the recording and reproducing steps, so that excellent recording and reproducing performances can be obtained.

As an example of a design related to a gap length of each head, in the separately recording and reproducing system using the coated tape such as an MP tape or the like, a gap length of the reproducing head is designed so as to be properly small in correspondence to a recording signal band and a gap length of the recording head is designed so as to be larger than that of the reproducing head. The reason is as follows.

It is necessary to design the gap length of the reproducing head as small as possible in order to reduce a gap loss in a high linear recording density region. However, when the gap length of the recording head is miniaturized so as to be almost the same as that of the reproducing head, an enough recording magnetic field cannot be obtained and a tape magnetic layer cannot be saturation recorded, so that a problem such that a reproduction output is deteriorated, enough overwrite characteristics cannot be obtained, or the like occurs.

Particularly, the magnetic layer of the conventional coated tape is thicker than that of the thin film tape, so that it is difficult to completely record up to a deep layer of the magnetic layer.

In recent years, the MP tape in which a thickness of the magnetic layer is equal to several hundreds nm or less has also been developed due to the improvement in magnetic powder forming the magnetic layer. In this case, since it is necessary to provide a large recording magnetic field which can cope with a large coercive force of more than 170 kA/m, guidelines for designing of the head related to the foregoing gap length is fundamentally similar to the above.

From the above viewpoints, in the present magnetic recording and reproducing system having a linear recording density of flux reversals of about 100 kfrpi or less, there are many cases where, generally, the gap length of the reproducing head is set to about 0.20 $\mu$m and the gap length of the recording head is set to 0.25 $\mu$m or more.

As mentioned above, in the magnetic tape memory apparatus such as VCR for broadcasting use, magnetic tape storage device for computer, or the like using the separately recording and reproducing method, an optimum design to maximumly extract the magnetic recording and reproducing performances of the tape has been made.

In the magnetic tape memory apparatus of the separately recording and reproducing system as mentioned above, hitherto, since coated tape such as an MP tape or the like is used as a medium, the magnetic head parameters for recording and reproduction are optimized for the coated tape.

When the thin film magnetic tape is used for the separately recording and reproducing system, an excellent performance of the thin film type tape is not necessarily exhibited. For instance, in a system optimized for the MP tape, irrespective of using the thin film tape, a case where only an S/N ratio that is equivalent to that of the MP tape is obtained also occurs.

Up to the present, there has been hardly any example of a research and a development of the magnetic tape memory apparatus for separately recording and reproducing by using the thin film type tape. Thus, a construction of the separately recording and reproducing system suitable for the thin film tape is also unknown.

From the above technical background, at present, there is no magnetic recording and reproducing apparatus according to the separately recording and reproducing method, which can sufficiently make the most of excellent high recording density characteristics of a thin film tape.

SUMMARY OF THE INVENTION

The invention is, therefore, made in consideration of the above subjects and it is an object of the invention to provide a magnetic recording and reproducing apparatus according to a separately recording and reproducing method using a thin film magnetic tape as a medium which can maximumly make the most of a performance of the thin film magnetic tape.

To solve the above subjects, according to the invention, there is provided a magnetic recording and reproducing apparatus for recording and reproducing a signal by using a thin film magnetic tape as a medium and also using ring type magnetic heads, wherein a gap length of the magnetic head for reproducing is larger than a gap length of the magnetic head for recording. It is preferable that the gap length of the recording head is equal to or less than 0.17 $\mu$m and that the gap length of the reproducing head is equal to or less than 0.20 $\mu$m. Further, a saturation flux density of a magnetic material forming a portion near a gap of a magnetic head core for recording is equal to or larger than 1.0 T and a saturation flux density of a magnetic material forming a trailing edge is larger than a saturation flux density of a magnetic material forming a leading edge.

The inventor et al. of the present invention examined with respect to constructions of the recording and reproducing heads suitable for using a thin film tape having an oblique magnetic anisotropy as described above. Thus, they discovered that it is desirable that the gap length of the recording head is set to a value of about a thickness of the magnetic layer of the tape or less and that the gap length of the reproducing head is set to a value that is slightly larger than that of the recording head. Such a fact is quite different from a case of a magnetic recording and reproducing apparatus using a coated tape.

A recording and reproducing mechanism peculiar to a thin film tape which extracted such a fact will now be described hereinbelow.

A recording step will be first explained.

In the recording step, generally, an easy axis which is obliquely inclined and a recording magnetic field direction on a leading edge side of the recording head are inclined in the same direction with respect to the film normal direction of the tape, thereby recording a signal onto the thin film tape. The recording magnetic field on the leading edge side of the recording head has a large magnetic field component in the easy direction. On the other hand, the recording magnetic field on a trailing edge side has a large magnetic field component in a hard direction of the tape and has a very small magnetic field component in the easy direction.

Consequently, the magnetic field on the leading edge side mainly contributes to a magnetic reversal in the magnetic layer of the tape. On the other hand, on the trailing edge side, the component in the easy direction of the head magnetic field is promptly attenuated. It is, therefore, considered that a magnetic transition steeper than that of the conventional longitudinal recording is obtained.

According to the examination of the inventor et al. of the invention, it is known that when the gap length of the recording head is reduced, the component in the easy direction of the head magnetic field on the trailing edge side is further sharply attenuated, so that a steeper magnetic transition is obtained. That is, by realizing a further narrower magnetic transition width, a recording resolution is improved and a high reproduction output can be obtained in, especially, a high linear recording density region.

Modulation noises of the thin film tape are caused by a zigzag domain of a magnetic transition region. Since the noises have a peak in a band region near a recording wavelength of 1 $\mu$m in which the highest reproduction output is obtained and a utility value is high in the thin film magnetic tape, the noises become a serious factor which influences an S/N ratio of the magnetic recording and reproducing system.

By the above-described construction of the invention, the recording at a high resolution having a steep magnetic transition region is performed, the zigzag domain of the magnetic transition region decreases, and the noises caused thereby can also be reduced.

Generally, a thickness of the magnetic layer of the thin film tape is thin, namely, equal to about 180 nm or less and a coercive force is equal to about 130 kA/m or less. As described above, since the recording head has a large component in the easy direction of the head magnetic field on the leading edge side, a magnetic reversal can be generated by the head magnetic field which is smaller than that for the coated tape. Therefore, different from a case of the coated tape, it is considered that even when a narrow gap head is used, the recording can be completely performed up to a deep layer in the magnetic layer.

From the above viewpoint, it is desirable that the gap length of the recording head when recording onto the thin film tape is smaller than that of the coated tape, preferably equal to about 0.17 $\mu$m or less.

In the future, when a magnetic tape memory apparatus having a linear recording density of a flux reversals of 150 kfrpi or more (a minimum reversal interval of 0.17 $\mu$m or less) is developed, in order to improve further higher linear recording density characteristics, it is considered that a thickness of magnetic layer of the thin film magnetic tape is equal to about 150 nm or less, preferably, about 100 nm or less.

In case of using such a thin film tape, even when the gap length of the recording head is reduced to about 0.10 mm or less, the recording can be sufficiently performed up to a deep layer in the magnetic layer and, as the gap length is set to be narrower, the improvement in recording characteristics is recognized. When the thickness of the magnetic layer is larger than 180 nm, there is a tendency that an effect due to the narrow gap recording of the invention gradually decreases.

The effect due to the narrow gap length in the above construction naturally depends not only on a thickness of the magnetic layer of the thin film tape but also on magnetic characteristics. Namely, it is desirable that the magnetic layer has a high orientation and a high magnetic anisotropy constant. According to the examination of the inventor et al. of the invention, in order to sufficiently obtain the effect in the recording due to the narrow gap length, it is preferable that a uniaxial anisotropy constant of the tape magnetic layer is equal to or larger than (2×105) J/m3. When the uniaxial anisotropy constant of the tape magnetic layer is smaller than the above value, since a diffusion in the easy direction in the thickness direction of the tape magnetic layer is large, an effect to obtain a steep magnetic transition by the head magnetic field on the trailing edge side cannot be sufficiently derived.

When actually introducing the above contents to the magnetic recording and reproducing apparatus, taking into consideration the various conditions such as the tape magnetic characteristics, the tape magnetic layer thickness, flux reversal density, necessary band region, and the like, the recording gap length is optimized within a range in which the effect due to the narrow gap recording is obtained.

A reproducing step will now be described hereinbelow. As mentioned above, from the viewpoint to reduce a gap loss in a high linear recording density region, it is necessary to design the gap length of the reproducing head as small as possible. That is, in the above-mentioned future magnetic tape memory apparatus having a linear recording density of a reversal flux of 150 kfrpi or more (minimum reversal interval of 0.17 μm or less), from the viewpoint of the reduction in gap loss, when the gap length of the reproducing head is smaller than that of the recording head and, desirably, it is equal to about 0.10 μm or less, a high reproduction output can be obtained in a high linear recording density region.

According to the examination of the inventor et al. of the invention, however, it is obviously understood that in the above narrow gap length region of about 0.20 μm or less, a magnetic flux conversion efficiency of the head as a reproducing head is remarkably deteriorated in association with a decrease in gap length.

It is also known that in an extremely high linear recording density region, since an amount of an increase in output due to the gap loss reduction is larger than an amount of a decrease in output due to the deterioration in magnetic flux conversion efficiency, a relative high output can be obtained.

On the other hand, in a relative low linear recording density region on which an influence by the gap loss is little, there is not any effect by the reduction in gap loss, and the decrease in output in association with the deterioration in magnetic flux conversion efficiency is remarkable, so that an S/N ratio in a band region necessary for the magnetic recording and reproducing system is deteriorated.

As for the gap length of the reproducing head, therefore, in order to obtain a maximum S/N ratio in consideration of the band region necessary for the magnetic recording and reproducing system, optimum dimensions (or parameters) have to be selected by comparing the increase in output due to the reduction in gap loss with the magnetic flux conversion efficiency. Consequently, according to the examination of the inventor et al. of the invention, it is known that it is desirable to set the gap length of the reproducing head to be slightly larger than that of the recording head.

In the construction, even when a reproduction output in an extremely high linear recording density region is slightly deteriorated, a high output can be obtained in a region in which a serious influence is exerted on the S/N ratio of the whole magnetic recording and reproducing system and the maximum S/N ratio in the necessary region can be obtained.

In the magnetic tape memory apparatus for recording and reproducing, especially, a digital signal, the effect by the construction is more valid when partial response Class 4 [PR (1, 0, −1)] or Class 1 [PR (1, 1)] is used as a detecting system of a reproduction signal.

In the digital magnetic recording and reproduction, generally, an interference between reproduction codes becomes a cause of a data detection error. In order to eliminate the inter-code interference, an equalization to deform a spread waveform is performed. Hitherto, consequently, a detecting system for performing an integral equalization to compensate differential characteristics which occur due to the magnetic recording and reproduction and to suit equalization characteristics to Nyquist characteristics in which no inter-code interference occurs has been used.

In the integral detecting system as mentioned above, in order to narrow a reproduction impulse width, a high frequency component in a reproduction signal is emphasized. In this instance, however, noises are also similarly amplified. In order to obtain a high S/N ratio by the foregoing system, it is necessary to provide an output of a high band in the performance of the magnetic recording and reproducing system before the equalization.

As for a reproduction signal in the magnetic recording, however, due to a shorter wavelength loss such as above-mentioned gap loss, spacing loss, or the like, it is more difficult to obtain a high reproduction output in a region of a higher linear recording density.

In the recording and reproducing apparatus using the conventional integral detecting system, in order to obtain a high S/N ratio, it is necessary to obtain a high reproduction output in a high frequency 1/2 T corresponding to a bit period T. Accordingly, the shorter wavelength loss becomes a serious factor which obstructs to realize a high linear recording density of the recording and reproducing apparatus.

In the partial response system, by intentionally exerting an already-known inter-code interference, an S/N ratio at a detection point after completion of the equalization can be improved without emphasizing noises of a high band. Thus, a linear recording density that is higher than that of the conventional system can be realized.

For example, by exerting an inter-code interference, impulse (0, 0, 0, 1, 0, 0, 0) is handled as (0, 0, 0, 1, 1, 0, 0, 0) in partial response Class 1 and is handled as (0, 0, 0, 1, 0, −1, 0, 0, 0) in partial response Class 4.

By using the impulse response, the former is expressed as PR (1, 1) and the latter is expressed as PR (1, 0, −1). In the ordinary equalization to the Nyquist characteristics, since the impulse (0, 0, 0, 1, 0, 0, 0) is handled as impulse (0, 0, 0, 1, 0, 0, 0) as it is, it can be also expressed as PR (1).

FIG. 9 shows equalization characteristics of PR (1, 1) and PR (1, 0, −1) together with the ordinary Nyquist equalization characteristics of PR (1) (Etoh, "Signal processing technique for digital recording", the magazine of The Institute of Television Engineers of Japan, Vol. 45, No. 12, pp. 1511 to 1514, 1991).

As will be obviously understood from FIG. 9, as for PR (1, 1) and PR (1, 0, −1), in a signal spectrum after completion of the equalization, a signal output at 0.5 in an axis of abscissa, namely, at the frequency 1/2T corresponding to the bit period T is processed as 0. A reproduction output and noises at 0.25 in the axis of abscissa, namely, in a band region near a frequency 1/4T or in a band region of a further lower frequency are regarded as important, so that it is known that a dominant influence is exerted on an S/N ratio.

That is, in partial response Class 1 and Class 4, even when the reproduction output of the magnetic recording and reproducing system in a high linear recording density region near the frequency 1/2T corresponding to the bit period T is slightly inferior, a necessary S/N ratio can be satisfied by a signal component of a low band in which the shorter wavelength loss is little. Therefore, the partial response Class 1 and Class 4 are suitable for realization of a high linear recording density of the apparatus.

In those detecting systems as well, although it will be obviously understood that the recording with a resolution as high as possible is needed in the recording step, the shorter wavelength loss concerned with the gap loss, spacing loss, or the like can be permitted to some degree in the reproducing step.

According to the construction of the invention as mentioned above, in the recording step, the high resolution recording having a steep magnetic transition and low noise components can be performed by the recording head with the narrow gap. In the reproducing step, although a reproduction output in a high linear recording density region is slightly low due to the gap loss, a high reproduction output can be obtained by realizing a high magnetic flux conversion efficiency in a relative low linear recording density region. According to the construction of the invention, therefore, characteristics of the magnetic recording and reproducing system which is very suitable to the reproducing system using above partial response Class 4 or Class 1 can be realized.

As mentioned above, in the separately recording and reproducing system using a thin film tape, a reduction in gap length of the reproducing head so as to be smaller than that of the recording head, in a manner similar to a case of the recording and reproducing apparatus using a coated tape, doesn't make sense for the optimization of the head parameter. In this case, it would be better that the reproducing head with the narrow gap is also used as a recording head, thereby constructing a self recording and reproducing system.

According to the invention, as described above, due to the construction such that the gap length of recording head is set to an enough small value and the gap length of reproducing head is set to a value slightly larger than that of the recording head, which is quite different from that using a coated tape, there can be provided the separately recording and reproducing system using a thin film tape in which the recording and reproducing characteristics are more excellent.

By the above construction according to the invention, in the magnetic tape memory apparatus such as VCR, magnetic tape storage device for computer, or the like, the recording and reproduction can be performed with a higher S/N ratio and a higher recording density than those of the conventional apparatus, and further, a magnetic recording and reproducing apparatus of a smaller size and a larger capacity can be provided.

DETAILED DESCRIPTION OF THE PREFERRED EMBODIMENTS

Preferred embodiments in a magnetic recording and reproducing apparatus of the invention will now be described in detail hereinbelow with reference to the drawings.

A magnetic recording and reproducing apparatus according to the first embodiment of the invention will now be described.

In the first embodiment, an optimum construction regarding gap lengths of recording and reproducing heads in a magnetic tape memory apparatus (an example of the magnetic recording and reproducing apparatus) having a rotating cylinder provided with a recording head and a reproducing head will be explained.

As a medium to be used in the explanation, a thin film tape having a Co—O magnetic layer formed by an oblique evaporation deposition is used. A thickness of the magnetic layer of the thin film tape is equal to 130 nm, a coercive force is equal to 120 kA/m, a uniaxial anisotropy constant is equal to $(2.7 \times 105)$ J/m$^3$, and a saturation magnetization is equal to 580 kA/m. As a head, an MIG (metal in gap) type head in which a gap formation surface is constructed by a metal soft magnetic film with a saturation flux density of 1.3 T is used.

In the magnetic tape memory apparatus, an experiment on recording and reproducing of RF signals was made, in which a relative velocity between the head and tape is set to 3.1 m/sec, a minimum flux reversal interval on the tape is set to 0.127 μm, a flux reversal density is set to 200 kfrpi, and a band region is set to 12.2 MHz.

Figure 1:
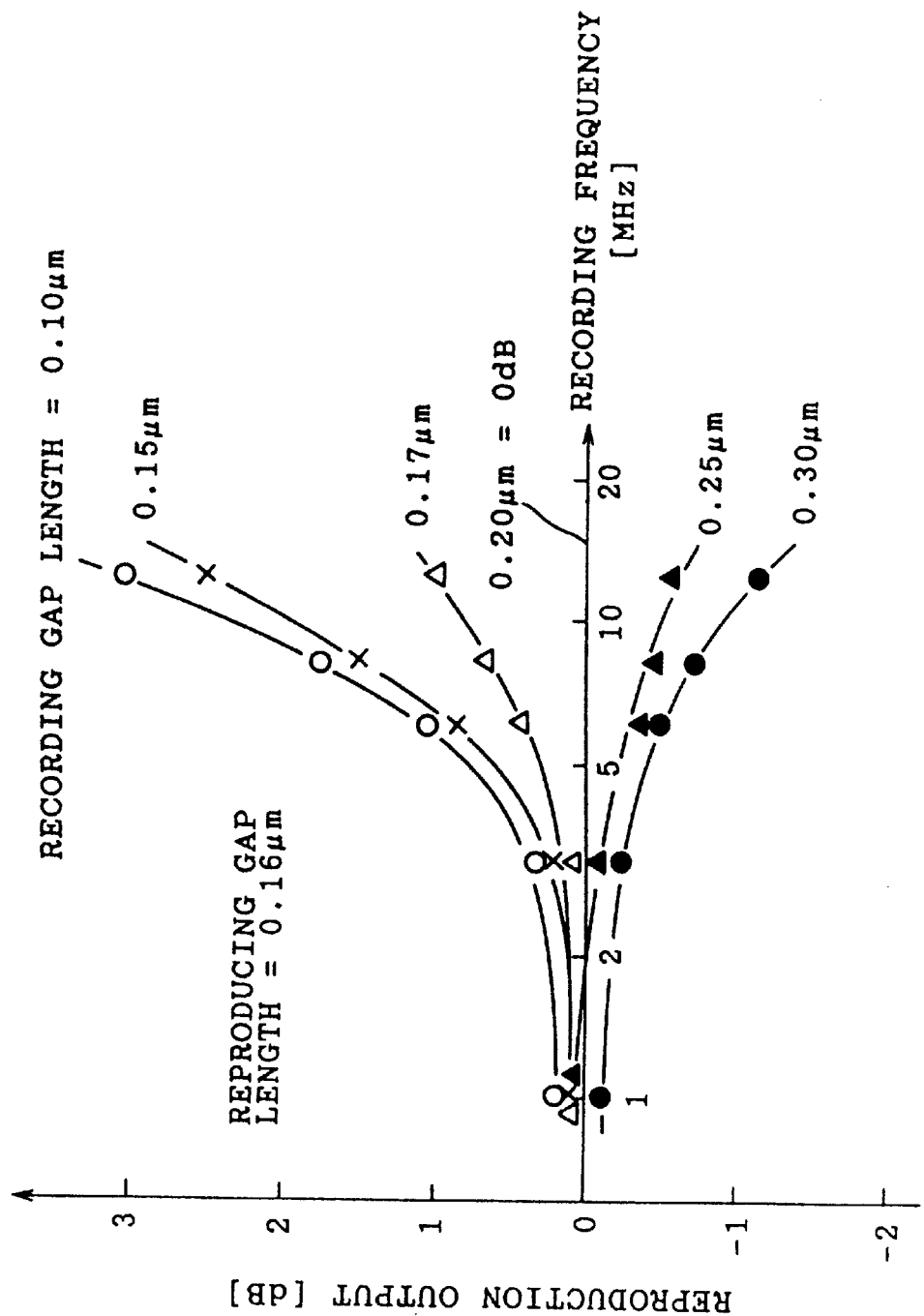
FIG. 1 is a diagram showing a relation between a gap length of a recording head and a reproduction output.

FIG. 1 shows how a reproduction output depends on a gap length of the recording head (recording gap length). A gap length of the reproducing head (reproducing gap length) of 0.16 μm is used. In FIG. 1, 0 dB is set to a reproduction output when a gap length of the recording head is set to 0.20 μm and a reproduction output is shown by a relative value for 0 dB. As shown in FIG. 1, the smaller the recording head gap length is, the more excellent a recording performance for a thin film tape is. An output improvement effect due to the recording head gap length is noticeable, especially when the gap length is 0.17 μm or less. Since the output improvement effect due to a narrow gap is larger in the higher linear recording density region, the above-explained consideration such that an decrease in magnetic transition width extracts the above result is supported.

Figure 2:
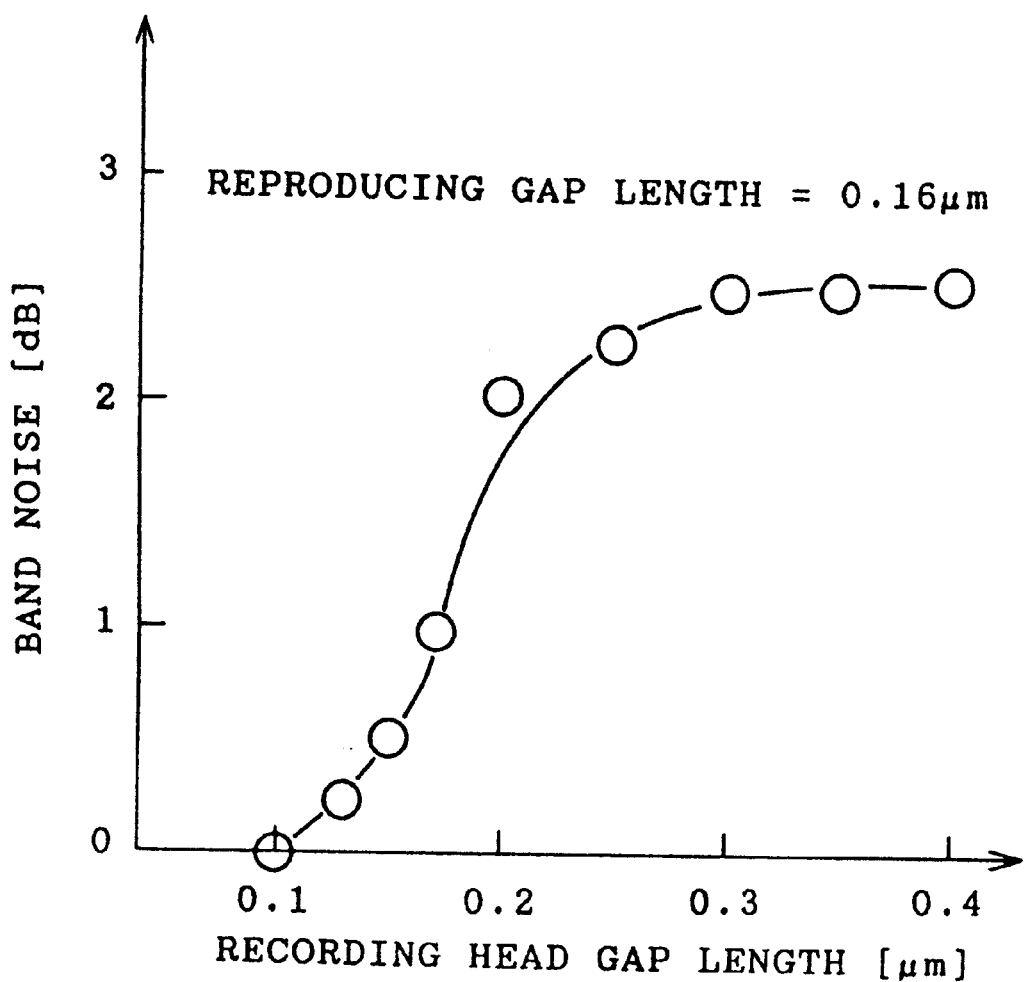
FIG. 2 is a diagram showing a relation between the gap length of the recording head and band noises.

FIG. 2 shows how a band noise depends on the recording head gap length when a signal in which a recording wavelength is equal to 0.25 μm and a frequency is equal to 12.2 MHz according to the same measurement is recorded. In FIG. 2, 0 dB is set to a band noise when a recording head gap length is set to 0.10 μm and a band noise is shown by a relative value for 0 dB. In case of the recording with a narrow gap of 0.17 μm or less, not only an output is improved but also band noises can be reduced. Consequently, it will be understood that the S/N ratio can be remarkably improved.

It is considered that the reduction effect in noises due to the narrow gap shown in FIG. 2 is caused by a fact such that noise components originated in the zigzag domain in the magnetic transition region are reduced due to the decrease in magnetic transition width. As described in the summary of the invention, the noise components have a peak in a low band region near a recording wavelength of 1 μm. In the digital signal reproducing system using partial response Class 1 and Class 4 as detecting system in which an S/N ratio in a low band is regarded as important, therefore, the reduction in noises is particularly effective.

A dependency of the recording head gap length similar to those in FIGS. 1 and 2 is also confirmed when the reproducing head gap length is changed within a range from 0.08 to 0.30 μm. Accordingly, the recording head gap length is a head parameter which does not depend on the reproducing head gap length but can be independently optimally designed.

The dependency of the recording head gap length in a region in which the recording head gap length is further smaller than 0.10 mμ mainly depends on the performance of the tape magnetic layer.

That is, when the tape magnetic layer itself has an enough resolution, the recording characteristics are further improved by reducing the recording head gap length so as to be smaller than 0.10 μm. In this case, it is necessary to reduce a thickness of magnetic layer of the thin film tape in accordance with the minimum magnetic reversal interval.

When the performance of the tape magnetic layer is not enough, since a resolution of the tape magnetic layer becomes a dominant factor, the improvement effect in the recording characteristics due to the narrow recording head gap length is hardly obtained in the region of 0.10 μm or less.

In case of recording a signal at a high density in which a minimum reversal interval is further small and a flux reversal density exceeds 200 kfrpi as well, the improvement effect in the recording characteristics due to the narrow recording head gap length as mentioned above is similarly confirmed.

In this case as well, however, in order to realize an enough S/N ratio, a proper performance of the tape magnetic layer is required.

In the above-mentioned viewpoint, according to the examination additionally performed by using a thin film tape in which a thickness of magnetic layer is equal to 60 nm, a coercive force is equal to 145 kA/m, a uniaxial anisotropy constant is equal to $(3.0 \times 10^5)$ $J/m^3$, and a saturation magnetization is equal to 600 kA/m, in case of recording a signal at a high density up to a minimum reversal interval of 63 nm and a flux reversal density of 400 kfrpi, the improvement effect in recording characteristics due to the narrow gap length is confirmed until the recording head gap length reaches 0.08 μm.

Figure 3:
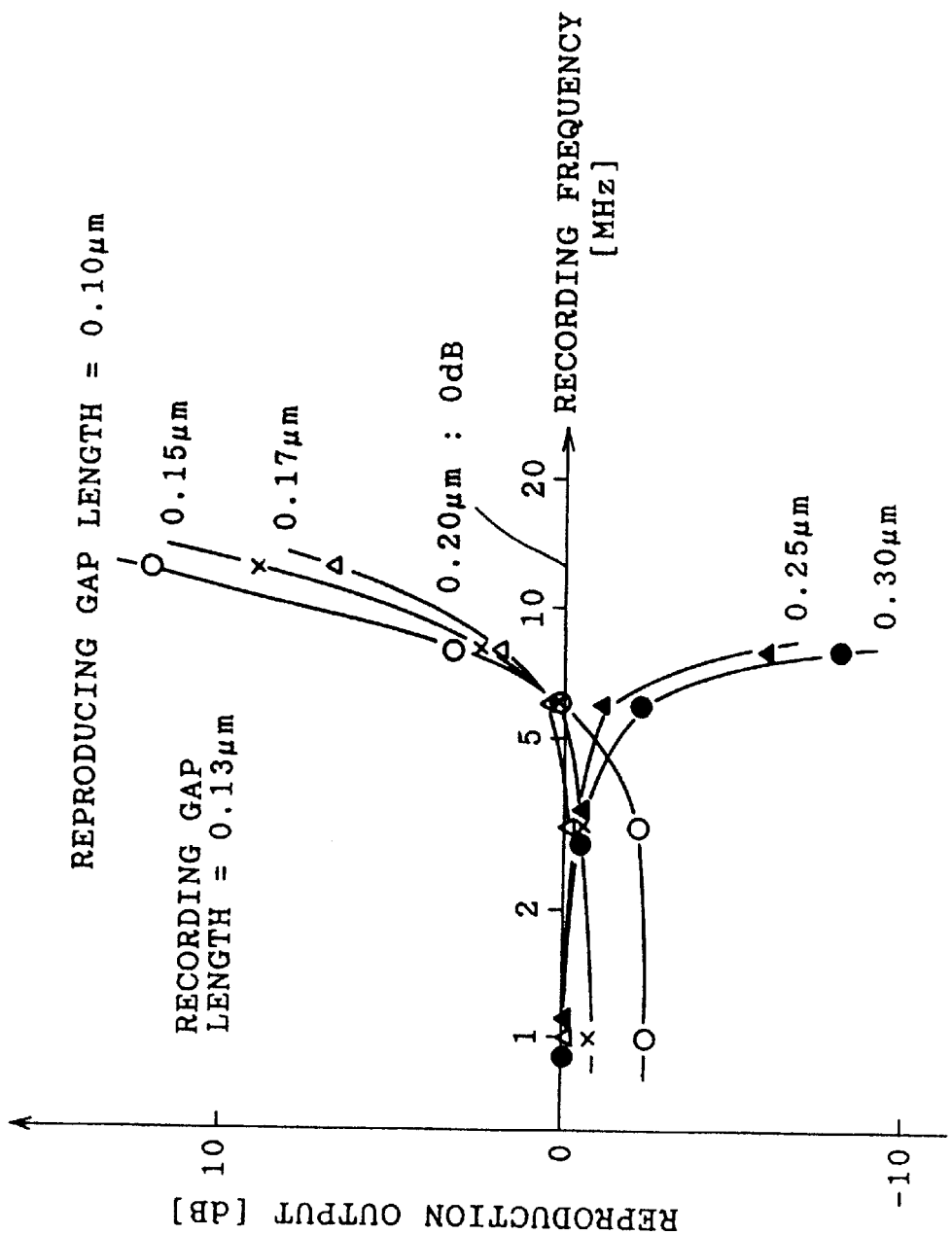
FIG. 3 is a diagram showing a relation between a gap length of a reproducing head and a reproduction output.

FIG. 3 shows a dependence of the reproduction output on the reproducing head gap length. The recording head gap length of 0.13 μm is used. In FIG. 3, 0 dB is set to a reproduction output when the reproducing head gap length is set to 0.20 μm and a reproduction output is shown by a relative value for 0 dB. As shown in FIG. 3, the smaller the reproducing head gap length is, the more excellent the reproducing performance in the high linear recording density region is. This is because the gap loss is reduced.

In a low density region, however, when the reproducing head gap length is smaller than about 0.15 μm, the reproducing performance is deteriorated in association with a reduction in reproducing head gap length. It is considered that this is because a magnetic flux conversion efficiency is detrioriated in a region of the above-mentioned narrow gap length. When considering to improve the S/N ratio in the whole magnetic recording and reproducing system, therefore, it is desirable that the reproducing gap length is slightly larger than the recording gap length and that in case of the example in FIG. 3, it is equal to the value from 0.15 to 0.17 μm.

In this case, although the reproduction output in the extremely high linear recording density region is slightly deteriorated by the gap loss, a high output can be obtained in the band in which a dominant influence is exerted on the S/N ratio of the whole magnetic recording and reproducing system, so that the maximum S/N ratio in the necessary band can be obtained.

In the digital signal reproducing system using partial response Class 1 and Class 4 as detecting system in which an S/N ratio in a low band is regarded as important, the above construction is especially effective. When the reproducing head gap length is larger than 0.20 μm, however, the influence due to the gap loss increases, so that the output is remarkably deteriorated in the wide band from the relative low linear recording density region to the high linear recording density region. It is, therefore, undesirable.

When the recording head gap length is changed within a range of about 0.17 μm or less, in which the superior recording performance is recognized in FIGS. 1 and 2, a tendency similar to that in FIG. 3 is confirmed. As shown in the first embodiment, therefore, in the magnetic recording and reproducing apparatus for recording at an unprecedented high linear density, it is obviously understood that it is desirable that the recording head gap length is set to 0.17 mm or less and the reproducing head gap length is optimally designed so as to be larger than the recording head gap length and is equal to or less than 0.20 mm.

The magnetic recording and reproducing apparatus in the second embodiment of the invention will now be explained. The second embodiment shows an apparatus made by improving that of the first embodiment. According to the embodiment, by using the magnetic tape memory apparatus having the rotating cylinder in which the recording head and reproducing head are mounted, a saturation flux density $B_S$ of a magnetic material constructing a gap formation surface of the recording head is optimally constructed.

As a recording medium, the same thin film tape having a Co—O magnetic layer formed by the oblique evaporation deposition as that used in the first embodiment is used.

The examination was performed by using six kinds of MIG type heads having different saturation flux densities of the metal soft magnetic films constructing the gap formation surfaces on the trailing edge (rear edge) side and leading edge (front edge) side as recording heads. Each gap length of the recording head is set to 0.10 μm on the basis of the result of the first embodiment. The following table 1 shows constructions of the six kinds of heads used in the second embodiment.

TABLE 1

| Recording head | $B_{S\ T}$ (T) | $B_{S\ L}$ (T) |
|---|---|---|
| A | 1.0 | 1.0 |
| B | 1.5 | 1.5 |
| C | 1.3 | 1.0 |
| D | 1.5 | 1.1 |
| E | 0.7 | 0.7 |
| F | 1.3 | 0.7 |

In this instance, $B_{S\ T}$ and $B_{S\ L}$ denote the saturation flux densities of the metal soft magnetic films constructing the gap formation surfaces on the trailing edge (rear edge) side and the leading edge (front edge) side of the head, respectively. Each of three kinds of heads C, D, and F is a head having a novel construction which is different from the head with the conventional construction and in which the saturation flux density on the trailing edge (rear edge) side is set to be larger than that on the leading edge (front edge) side.

Consequently, each of the heads C, D and F can generate a head magnetic field which is asymmetry for a gap center line with an exciting current of a predetermined value or more.

As a reproducing head, an Mn—Zn ferrite head is used. On the basis of the result in the first embodiment, the gap length of the reproducing head is set to 0.15 μm. In the magnetic tape memory apparatus of the second embodiment, in a manner similar to the first embodiment, the experiment in recording and reproducing of RF signals was made, in which a relative velocity between the head and tape is set to 3.1 m/sec, a minimum flux reversal interval on the tape is set to 0.127 μm, a flux reversal density is set to 200 kfrpi, and a band region is set to 12.2 MHz.

Figure 4:
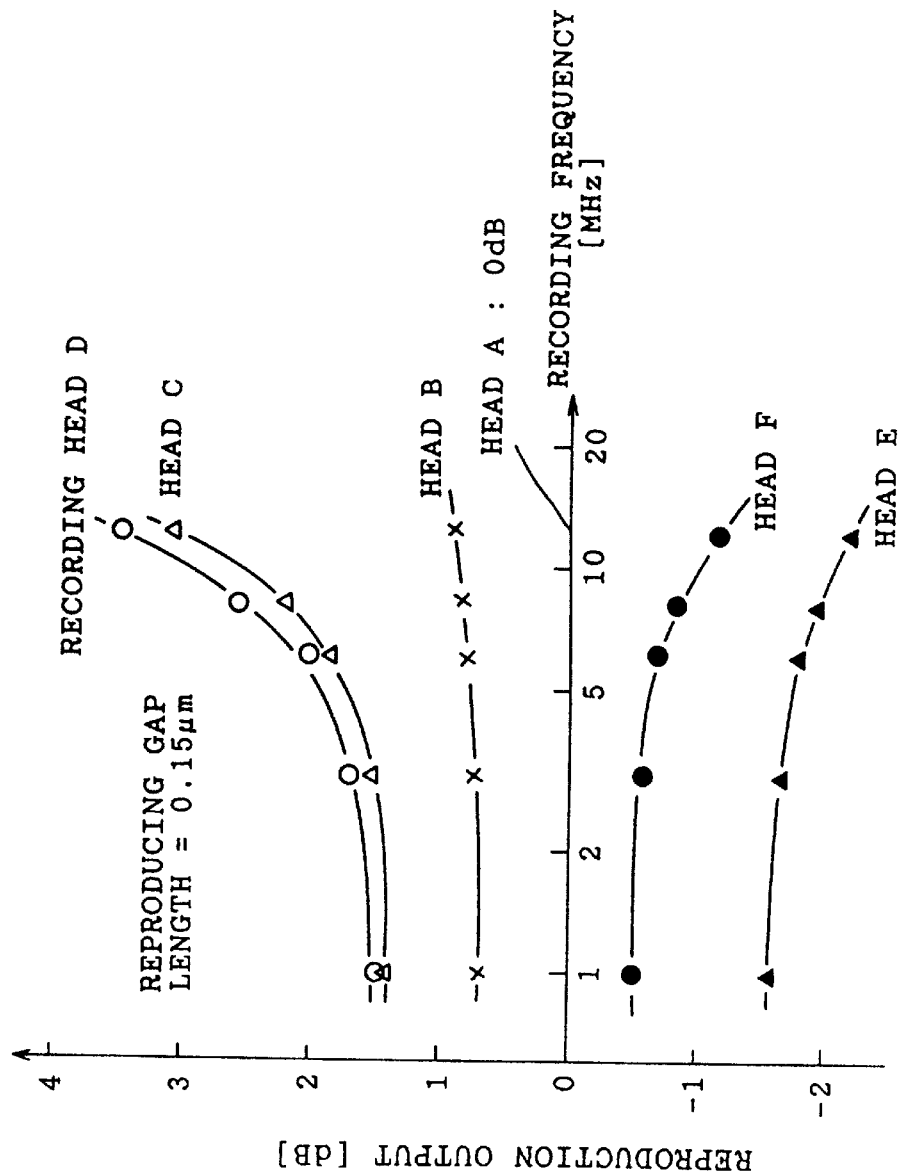
FIG. 4 is a diagram showing a relation between a saturation flux density of the recording head and the reproduction output.

FIG. 4 shows reproduction outputs in case of using various recording heads. In the diagram, 0 dB is set to a reproduction output when the recording head is set to a head A and the output is shown by a relative value for 0 dB.

When comparing heads A, B, and E, each having a construction in which the saturation flux densities on the trailing edge and leading edge sides are the same, a recording performance is improved in association with an increase in saturation flux density. When considering a high coercive force of 120 kA/m of the tape, a recording ability of the head E with the saturation flux density of 0.7 T is obviously insufficient. However, the recording performance of the head B with the saturation flux density of 1.5 T is improved only by a little under 1 dB as compared with that of the head A with the saturation flux density of 1.0 T.

As described above, in the head with the conventional construction in which the saturation flux densities on the trailing edge and leading edge sides are the same, even when the saturation flux density is increased so as to be equal to or larger than 1.5 T, the improvement in recording performance cannot be expected further. Namely, this is because even in case of the tape having a high coercive force of 120 kA/m, the recording ability of the head with the conventional construction is saturated at a saturation flux density of about 1.0 T or more.

In the heads C and D with the novel construction which is so designed that the saturation flux density on the trailing edge side is larger than that on the leading edge side, a further remarkable improvement in recording performance is recognized as compared with the head B.

A mechanism to improve the recording performance in the heads C and D is considered as follows. As already described, in the recording step of the oblique oriented thin film tape, when the gap length of the recording head is reduced, components in the easy direction of the magnetic field on the trailing edge side are steeply attenuated, so that a narrower magnetic transition width can be obtained and a high reproduction output can be obtained.

In the heads C and D, since the saturation flux density on the trailing edge side is larger than that on the leading edge side, the magnetic saturation is generated in a portion near the leading edge by an exciting current of a predetermined value or more, thereby generating the head magnetic field which is asymmetry for the gap center line and exhibits a further larger gradient on the trailing edge side than that on the leading edge side. That is, in the heads C and D in each of which the asymmetry head magnetic field is generated as mentioned above, the components in the easy direction of the head magnetic field on the trailing edge side are steeper attenuated than the case of the head B, so that a further narrower magnetic transition width can be obtained. Accordingly, the heads C and D can obtain a high reproduction output in, especially, a high linear recording density region as compared with the head B.

According to the heads C and D, noises caused by the zigzag domain in the magnetic transition region can be further reduced by the high resolution recording due to the above-mentioned mechanism.

In order to generate an asymmetry magnetic field, it is sufficient to set the saturation flux density on the trailing edge side to be larger than that on the leading edge side. In this instance, however, it is necessary to set the saturation flux density on the leading edge side to be equal to or larger than 1.0 T. When the saturation flux density on the leading edge side is smaller than 1.0 T, the head magnetic field on the leading edge side is insufficient for the tape with a high coercive force as used in the second embodiment, so that the recording performance is deteriorated. This is the reason why the recording performance of the head F is inferior to those of the heads A and B in FIG. 4.

Therefore, it is obviously understood that in order to sufficiently obtain the effect in the construction of the second embodiment, it is necessary that the saturation flux density of the magnetic material constructing the portion near the gap of the recording head is set to 1.0 T or more and the saturation flux density of the magnetic material constructing the trailing edge is set to be larger than that of the magnetic material constructing the leading edge.

The magnetic recording and reproducing apparatus in the third embodiment of the invention will now be explained.

It becomes clear from the result in the first embodiment that it is desirable to set the gap length of the recording head to about 0.17 μm or less.

In the narrow gap head, however, when a gap depth is reduced to several μm or less, a magnetic saturation easily occurs in an edge portion in a head track width direction, so that there is a case where steepness of the head magnetic field is deteriorated in the edge portion rather than in a track center portion. In a track recorded by the head, a phase deviation of the magnetic transition or a variation of the magnetic transition width occurs in the track width direction, thereby causing a deterioration in reproduction output or a phase change in reproduction waveform. It is, therefore, undesirable. In the magnetic tape memory apparatus, since the head is come into contact with the tape and is slid to be worn, a reduction in gap depth with the lapse of time cannot be avoided. The above phenomenon becomes a cause to shorten a life of the head.

The third embodiment is made by improving the first embodiment from the viewpoint to solve the subjects. The third embodiment relates to the saturation flux density $B_S$ of the magnetic material constructing the gap formation surface.

The recording head to be used in the third embodiment is characterized in that the gap formation surface is constructed by a metal soft magnetic film of a saturation flux density of 1.0 T or more and the saturation flux density of the metal soft magnetic film in a portion near an edge portion in the track width direction is larger than that in a portion near a center portion. By the construction, even when the gap depth is reduced to several μm or less, the magnetic saturation in the track edge portion is hardly generated, so that the head life is not deteriorated.

The construction of the recording head is realized in a manner such that, for example, a composition gradation in the track width direction is made in the metal soft magnetic film constructing the gap formation surface, thereby setting the saturation flux density in the track edge portion to be larger than that in the center portion. It is also sufficient that the gap formation surface is constructed by a plurality of metal soft magnetic films having a laminate structure, thereby setting the saturation flux density of the metal soft magnetic film located in the track edge portion to be larger than that of the metal soft magnetic film located in the track center portion. In this instance, it is necessary to pay attention to the saturation flux density so as to be equal to or larger than 1.0 T even in the track center portion. When the saturation flux density is smaller than 1.0 T, there is a case where sufficient recording performance cannot be obtained for a high coercive force medium.

Figure 5:
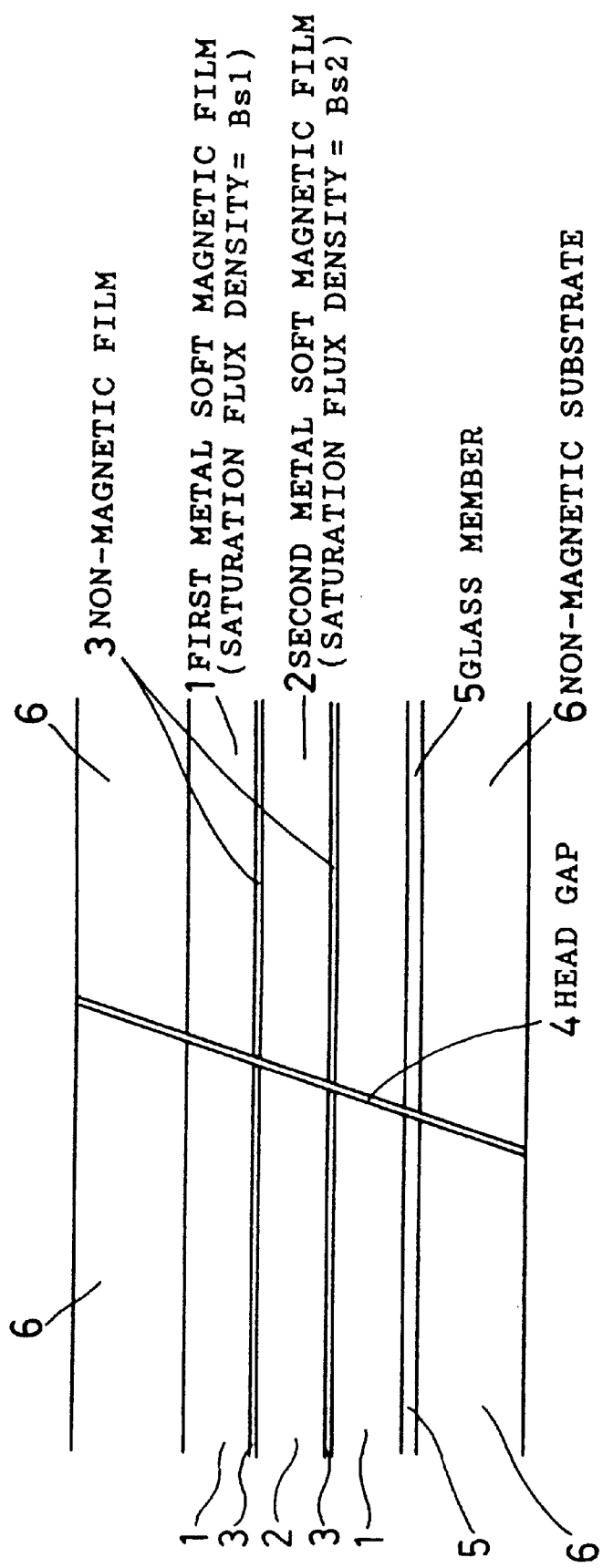
FIG. 5 is a diagram showing an example of a construction of a tape sliding surface of the recording head provided for a magnetic recording and reproducing apparatus of the invention.
Figure 6:
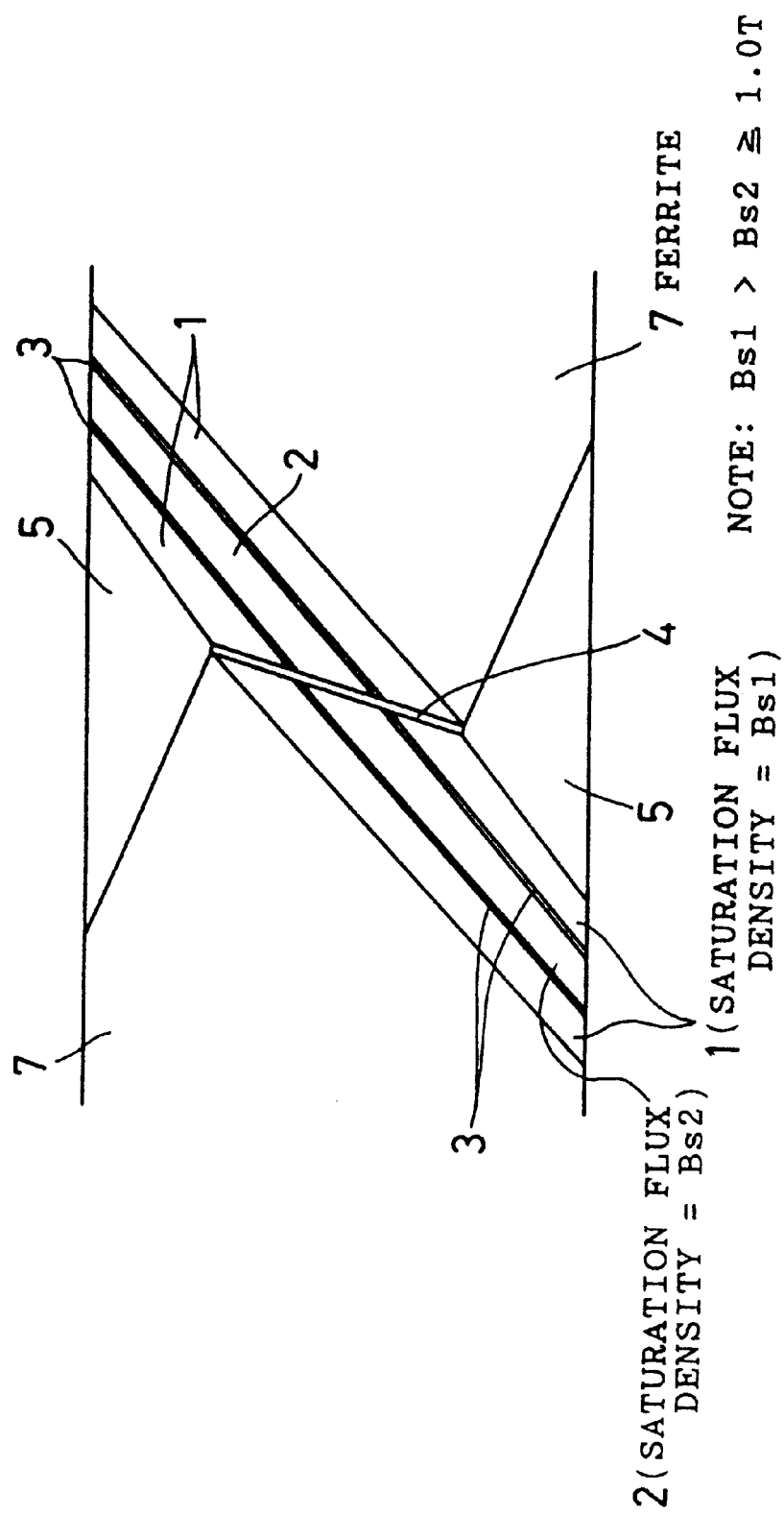
FIG. 6 is a diagram showing an example of a construction of the tape sliding surface of the recording head provided for the magnetic recording and reproducing apparatus of the invention.

FIGS. 5 and 6 show constructional examples of a sliding surface of the recording head having the latter laminate structure. FIG. 5 shows an example of a sandwich type head and FIG. 6 shows an example of an MIG type head.

Each head is constructed in a manner such that a first metal soft magnetic film 1 constructing a track edge portion and a second metal soft magnetic film 2 constructing a track center portion are laminated through a non-magnetic film 3. In the diagram, reference numeral 4 denotes a head gap; 5 a glass member; 6 a non-magnetic substrate; and 7 ferrite.

When it is assumed that a saturation flux density of the first metal soft magnetic film 1 is set to $B_{S\ 1}$ and that a saturation flux density of the second metal soft magnetic film 2 is set to $B_{S\ 2}$, it is necessary to satisfy the following relation.

$$B_{S\ 1} > B_{S\ 2} \geq 1.0 T$$

In FIGS. 5 and 6, the examples in which the gap formation surface is constructed by a three-layer laminate film composed of two kinds of metal soft magnetic films are shown. The head used in the third embodiment is not limited to the example. So far as the saturation flux density in the track edge portion is larger than that in the center portion, the head can be also composed of three kinds or more of metal soft magnetic films and a laminate film in which metal soft magnetic films are laminated by four or more layers can be also used.

In the following case, even in case of a laminate film in which metal soft magnetic films are laminated by two layers, the effect according to the invention can be obtained.

That is, when the track width of the recording head is larger than a track pitch of the magnetic recording and reproducing apparatus and a previously recorded portion of the track is overwritten, it is sufficient that the saturation flux density of the track edge portion is set to be larger than that of the center portion only on the side in which the overwriting is performed. This is because in the track edge portion on the other side to be overwritten, even when the magnetic saturation is generated and the phase deviation in the magnetic transition or the variation in the magnetic transition width is generated, the overwriting is executed by a track to be subsequently recorded, so that a problem hardly occurs.

On the other hand, when the track width of the recording head is smaller than the track pitch of the magnetic recording and reproducing apparatus and the recording is performed by providing a guard band between tracks, if the saturation flux densities in the both edge portions of the track are not set to be larger than that of the center portion, the effect in the third embodiment is hardly obtained.

The laminate type recording head having the construction of FIG. 5 is mounted in the recording and reproducing apparatus used in the first and second embodiments and signals are recorded, providing guard bands onto the same thin film tape as that used in the first and second embodiments. After that, the signal pattern of the recording track is observed by a Bitter method.

$B_{S\ 1}$ of the recording head is set to 1.3 T and $B_{S\ 2}$ is set to 1.0 T. For comparison, the similar observation is made with respect to a head in which both of $B_{S\ 1}$ and $B_{S\ 2}$ are set to 1.0 T and a head in which both of $B_{S\ 1}$ and $B_{S\ 2}$ are set to 1.3 T. In all of the recording heads, a gap length is set to 0.1 μm and a gap depth is set to 2 μm.

According to the examination, in order to more clearly observe the above-mentioned subjects with which the third embodiment is concerned, the recording at a high magnetomotive force of 1.0 ATp-p is performed.

Figure 7:
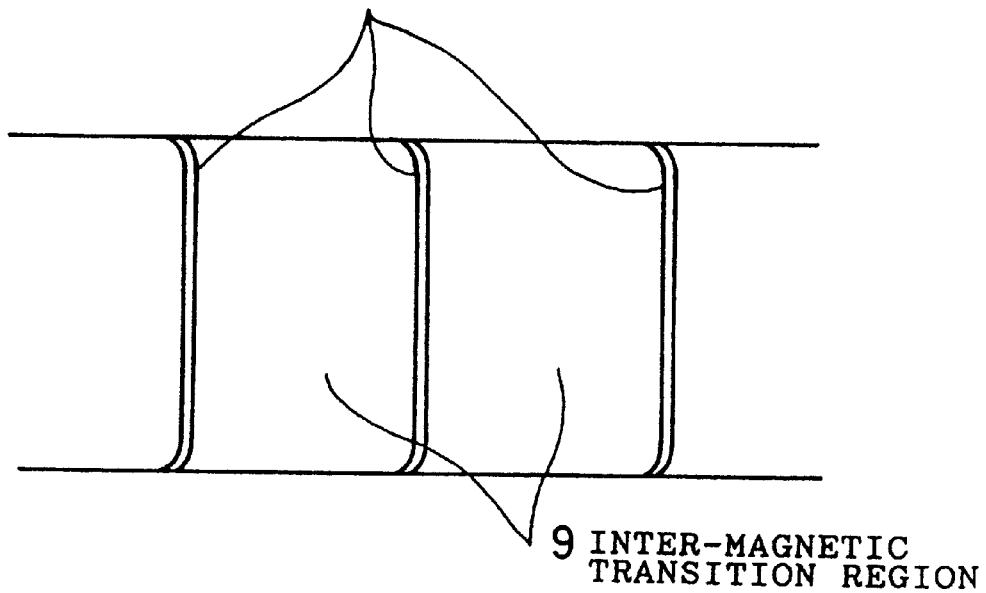
FIG. 7 is a diagram showing a bit pattern of a recording track.

FIG. 7 shows a bit pattern by the head in which both of $B_{S\ 1}$ and $B_{S\ 2}$ are equal to 1.0 T as a comparison example. It is recognized that a magnetic transition region 8 is curved in a track edge portion and a phase deviation occurs. In the bit pattern by the head in which $B_{S\ 1}$ and $B_{S\ 2}$ are equal to 1.3 T as well, the similar result is confirmed.

Figure 8:
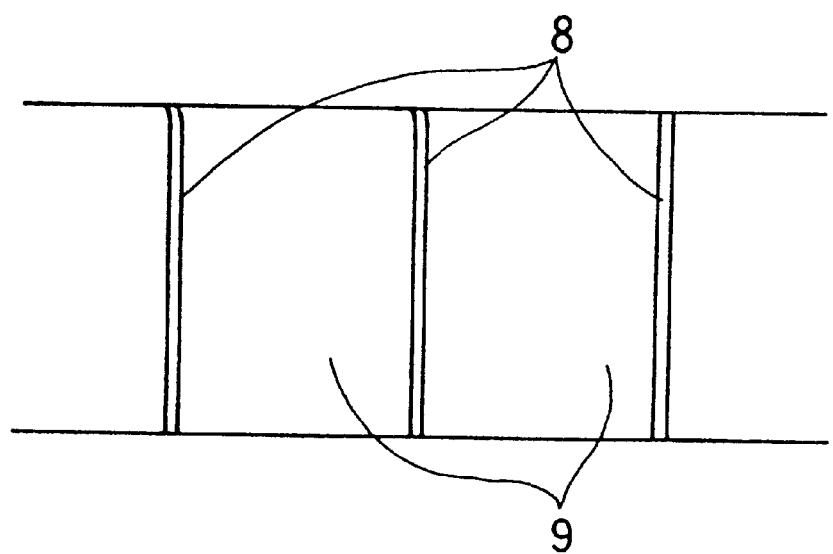
FIG. 8 is a diagram showing a bit pattern of the recording track.
Figure 9:
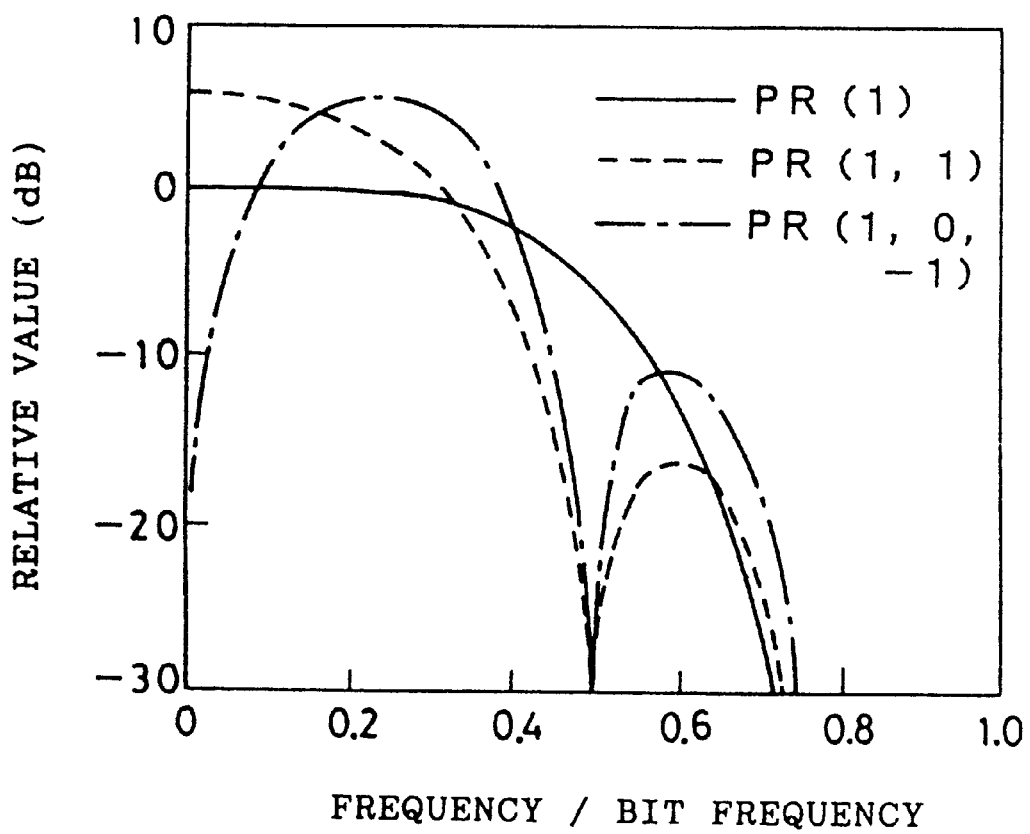
FIG. 9 is a diagram showing equalization characteristics of partial response.

FIG. 8 shows a bit pattern due to the head having the construction of the embodiment in which BS1 is equal to 1.3 T and BS2 is equal to 1.0 T. The curve in the magnetic transition region 8 in the track edge portion is not found and any influence by a saturation in the track edge portion of the head is not confirmed.

In the diagram, reference numeral 9 denotes an intermagnetic transition region.

The result similar to the above is also confirmed in the examination by using the recording head of the MIG type having the construction of FIG. 6.

As mentioned above, in case of using the recording head having the construction according to the embodiment, even with the conditions such as gap length of 0.1 μm, gap depth of 2 μm, and magneto-motive force of 1.0 ATp-p, an excellent recording and reproduction can be realized without exerting an adverse influence such as deterioration in reproduction output, phase change in reproduction waveform, or the like caused by the saturation in the track edge portion of the recording head. That is, a reduction in life of the head in the narrow gap head can be also prevented by using the construction of the third embodiment.

Although three examples have been described with respect to the preferred embodiments of the invention, when magnetic characteristics or the magnetic layer thickness of the thin film tape is changed within a practical range or when a thin film tape having a different composition is used, the result similar to those in the first to third embodiments can be similarly recognized. As for the recording and reproducing head, the effect of the invention can be similarly obtained by using any kinds of head such as MIG type head, sandwich type head, or the like.

Further, as a reproducing head, when a ferrite head or a thin film head having various compositions and structures is used, the effect of the invention can be obtained. Namely, the fundamental construction of the invention is not limited to those described in detail in the embodiments but it can be realized in various constructions to which the conventional technique is applied.

What is claimed is:

1. A magnetic recording and reproducing apparatus for recording and reproducing a signal onto thin film magnetic tape, said apparatus being constructed so that an easy axis of a magnetic film forming a magnetic recording layer is inclined from a film normal direction in a film normal plane including a tape longitudinal direction, said apparatus further comprising ring type magnetic heads, each of said ring type magnetic heads comprising:

a ring magnetic circuit comprising a magnetic core comprising ferromagnetic material and a gap comprising non-magnetic material provided in a portion of the magnetic core;

wherein a gap length of said ring type magnetic head is defined by a distance between a leading pole edge and a trailing pole edge on the magnetic core, said edges opposing each other across the gap, and a gap length of the ring type magnetic head for reproducing said signal is larger than a gap length of the ring type magnetic head for recording said signal.

2. An apparatus according to claim 1, wherein said apparatus is constructed so as to record and reproduce a signal in which a minimum flux reversal interval on said thin film magnetic tape is equal to or less than 0.17 $\mu$m and said gap length of the magnetic head for recording is equal to 0.17 $\mu$m or less and said gap length of the magnetic head for reproducing is equal to 0.20 $\mu$m or less.

3. An apparatus according to claim 2, wherein said apparatus is constructed so as to record and reproduce a digital signal to/from the thin film magnetic tape, and partial response Class 1 or partial response Class 4 is used as a detecting system of a reproduction signal.

4. An apparatus according to claim 2, wherein said magnetic film forming the magnetic recording layer has a film thickness of equal to or less than 180 nm and a uniaxial anisotropy constant equal to or larger than $(2 \times 105)$ J/m$^3$.

5. An apparatus according to claim 2, wherein a saturation flux density of a magnetic material forming a portion near a gap of a magnetic head core for recording is equal to or larger than 1.0 T and a saturation flux density of a magnetic material forming a trailing pole edge of said magnetic head core for recording is larger than a saturation flux density of a magnetic material forming a leading pole edge.

6. An apparatus according to claim 2, wherein a gap formation surface of a magnetic head core for recording is constructed by a metal soft magnetic film with a saturation flux density of 1.0 T or more and the saturation flux density of said metal soft magnetic film in a portion near an edge portion is larger than that in a portion near a center portion in the head track width direction.

7. An apparatus according to claim 6, wherein said gap formation surface of said magnetic head core for recording is constructed by a plurality of metal soft magnetic films having a laminate structure, and the saturation flux density of said metal soft magnetic film in a portion near the edge portion is larger than that in a portion near the center portion in the head track width direction.

* * * * *